United States Patent [19]

Battail

[11] 3,805,236

[45] Apr. 16, 1974

[54] DECODING DEVICE OF THE WEIGHTING AND FEED-BACK TYPE

[75] Inventor: Gerard Battail, Paris, France

[73] Assignee: Thomson-CSF, Paris, France

[22] Filed: Jan. 4, 1973

[21] Appl. No.: 321,015

[30] Foreign Application Priority Data

Jan. 7, 1972 France .......... 72.00497

Dec. 8, 1972 France .......... 72.43744

[52] U.S. Cl. .......... 340/146.1 AQ

[51] Int. Cl. .......... H03k 13/00, H04l 1/10

[58] Field of Search .......... 340/146.1 AQ

[56] References Cited

UNITED STATES PATENTS 3,697,950 10/1972 Low .......... 340/146.1 AQ

*Primary Examiner*—Felix D. Gruber

*Assistant Examiner*—R. Stephen Dildine, Jr.

*Attorney, Agent, or Firm*—Cushman, Darby & Cushman

[57] ABSTRACT

A plurality of complex replicas, or estimates, of each transmitted information bit, based on the parity-check equations, are formed in addition to the simple replica which the corresponding received information bit constitutes. To each replica is associated a likelihood magnitude of the form $\log_m(1-P)/P$ where P is the probability of the replica being erroneous.

The decision is made by an algebraic adder forming the sum of the likelihoods of different estimates of the information bit, those likelihoods being associated with a plus or minus sign according to whether the binary value of the replica is 0 or 1.

The sign of the sum gives the decoded value, and the absolute value of the sum, the likelihood of the decoded value.

8 Claims, 4 Drawing Figures

DECODING DEVICE OF THE WEIGHTING AND FEED-BACK TYPE

The present invention relates to an improvement in decoding devices of the weighting and feedback type used to deal with binary data coded in a systematic recurrent code adapted for threshold decoding.

Those skilled in the art will be aware that a binary code is referred to as systematic when the information bits are effectively transmitted as such, and that it is recurrent if the redundancy or parity-check bits which are transmitted in excess of the information bits, are the modulo 2 sums of information bits whose position numbers are determined by the position number of the parity-check bit in question in its series. (It is possible to utilise several series of parity-check bits in which bits of the same position number in the different parity-check bit series are constituted by different modulo 2 sums).

It will be remembered that a code lends itself to threshold decoding if it is possible to associate with each received information bit, a set of $q$ different modulo 2 sums of received bits, each of these including at least one parity-check bit and the information bit in question, and no received bit other than this information bit figuring in more than one of the $q$ sums, known as syndromes, associated with this bit. The choice of the parity-check and information bits constituting each of these sums, is such that its value is zero if none of said bits is affected by an error.

For decoding a received information bit, it has already been proposed to substitute for the criteria constituted by the syndromes, other criteria which, hereinafter, will be termed "complex replicas" of the transmitted bit corresponding to this received information bit, each of these complex replicas being the modulo 2 sum of the received bit and one of the syndromes associated therewith, which latter bit may be considered as a simple replica of the corresponding transmitted bit.

The replicas may be used (as well as the syndromes) in a decoding device of the weighting type, i.e. in which the several replicas used for a decision are weighted by weights so chosen as to render all the replicas substantially equally likely to cause errors.

Lastly a decoding device is of the feedback type if the previously corrected values are substituted for the received values in the replicas (or syndromes) containing information bits received prior to the bit for which a decision is to be made.

There has been proposed, in U.S. Pat. No. 3 303 333 a decoding device of the weighting and feedback type using the replicas. In this device, the weight of the replicas, which for short, will be here called the "likelihood" of the replicas, is proportional to $\log_e(P)/1-P$, where P is the probability of the replica being erroneous. This device, which operates with analogue likelihood circuits, uses a variable threshold which is the sum S of the likelihoods of all the replicas. The sum $S_1$ of the replicas whose value is 1 is compared to this threshold, and the output or decoded value is 1 or 0 according to whether $S_1$ exceeds S/2 or not. The likelihood which the absolute value is not used or even constitutes for the decoded value is not used or even calculated, and in the circuits used for computing the likelihood of a complex replica as a function of the likelihood of the different terms thereof, the already decoded bits are considered as not having any longer any random character. This has the drawback that an erroneous decoded value will involve a risk of further errors much greater than if its likelihood had been taken into account.

The present invention has for its object a decoding device which does not have this drawback, and which, in its preferred embodiment, uses substantially digital likelihood circuits.

According to the invention, there is provided a decoding device of the weighting and feedback type for decoding messages, comprising information and parity-check bits, transmitted in a systematic recurrent binary code adapted for threshold decoding, each received bit being associated with a likelihood signal, the likelihood of a random value being defined as a magnitude V proportional to $\log_m (1-P)/P$, where $m$ is a positive number, and P the probability of this value being erroneous, said decoding device comprising at least a first decoder, said decoder comprising: first, second, third and fourth storing means having outputs, for respectively storing said information bits, said parity-check bits, said likelihood signals associated with said information bits, and said likelihood signals associated with said parity-check bits; modulo 2 adding means having a first group of inputs coupled to said first and second storing means, a second group of inputs and $q'$ outputs for forming, for each received information bit, constituting a simple replica of the corresponding transmitted bit, $q'$ ($q'$ being a positive integer) independent complex replicas of this transmitted bit, said complex replicas being the modulo 2 sums respectively resulting from the suppression of the considered received information bit in $q'$ syndromes containing it, and the substitution in said syndromes of the decoded value for the received value as concerns the already decoded information bits, said $q'$ outputs of said adding means and a predetermined one of said outputs of said first storing means forming $(q'+1)$ first outputs for simultaneously delivering $(q'+1)$ replicas of an information bit; computing means having a first group of inputs coupled to said third and fourth storing means, a second group of inputs, and $q'$ outputs, for generating likelihood signals, at least approximately representative of the likelihood of each of said $q'$ complex replicas, said $q'$ outputs of said computing means and a predetermined one of said outputs of said third storing means forming $(q'+1)$ second outputs for simultaneously delivering $(q'+1)$ likelihood signals associated with said $(q'+1)$ replicas; an adder having a first group of $q''$ inputs respectively coupled to $q''$ of said $(q'+1)$ first outputs, for receiving $q''$ of said $(q'+1)$ replicas, where $q''$ is greater than 1 and smaller than $(q'+2)$, a second group of $q''$ inputs respectively coupled to $q''$ of said $(q'+1)$ second outputs for receiving the $q''$ likelihood signals associated with said $q''$ replicas, and first and second outputs, for forming the algebraic sum of said $q''$ likelihood signals, respectively associated with a plus or minus sign according to the binary value of the associated replica, and for delivering at said first output of said adder a decoded value corresponding to the sign of said algebraic sum, and at said second output a likelihood signal associated with said decoded binary balue, and representative of the absolute value of said algebraic sum; fifth storing means coupled to said first output of said adder for storing the decoded values; and sixth storing means coupled to said second output of said adder for storing said likelihood signal associated with the decoded values; said second group of inputs of said adding means being coupled to said fifth storing means and said second group of inputs of said computing means being coupled to said sixth storing means.

The invention will be better understood and other of its features will become apparent from the ensuing description and the related drawings in which.

In order to clarify the explanation, it will be assumed in the descriptions which now follow, that the bits which are only off-set in relation to one another by a small fraction of the clock period, corresponding to times required for logic operations such as a modulo 2 addition, are simultaneous.

Delays of this kind are of no significance if the output pulses from the equipment described, are then conventionally reshaped in a device utilizing a central part of the duration of the bit, by which to read its value. In situations where this is not the case, auxiliary delay devices can always be utilized to ensure strict synchronisation.

On the other hand, the explanation will take into account certain delay devices which are indispensable for the operation of the equipment.

Figure 1:
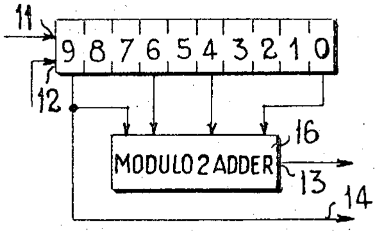
PRIOR ART FIG. 1
FIG. 1 is the diagram of a known type of encoder which enables coding of a kind suitable for threshold decoding.

FIG. 1 illustrates by way of example, a known coding device.

It comprises a shift register 15 with 10 stages, these stages being symbolised by the boxes which are separated by the broken lines and marked 0–9 commencing from the last stage of the register; the input 11 of the register thus directly supplies the stage 9. An input 12 has been used to symbolically represent the input of the register to which the advance pulses I are supplied by a clock of periodicity I.

Stages 0, 4, 6 and 9 of the register are provided with outputs respectively connected to the four inputs of a modulo 2 adder, 16, comprising three two-bit adders connected in series. The encoder comprises two parallel outputs, the outputs 14 which is connected to the output of the stage 9 of the register, the output 13 which is connected to the output of the adder 16.

The information bits are applied to the input 11 of the register at the rate of the clock pulses I.

To simplify notation and to abbreviate the language, a modulo 2 sum will be described in the same way as a conventional sum but will be followed by the notation "(M)"; similarly a modulo 2 sum 2 will be designated by the term "M sum".

$b_n$ will be used to designate the information bit which, at a reference instant $t_n$, occupies the stage 0 of the register 15, the bits following and preceding $b_n$ being respectively designated by $b_{n+1}$, $b_{n+2}$ and $b_{n-1}$, $b_{n-2}$ etc.

Then, at $t_n$ the bit $b_{n+9}$ appears at the output 14 and at the output 13 a redundancy bit or parity-check bit, which will be designated by $p_{n+9}$ and the expression for which is $p_{n+9} = b_n + b_{n+4} + b_{n+6} + b_{n+9}$ (M).

These two bits are transmitted, in parallel, for example, through two separate channels, to the other end of the connection.

In a general manner, at the instant $t_n = t_0 + nT$, where T is the periodicity of the clock pulses, the following will be transmitted $b_{n+9}$ and $p_{n+9} = b_n + b_{n+4} + b_{n+6} + b_{n+9}$.

Figure 2:
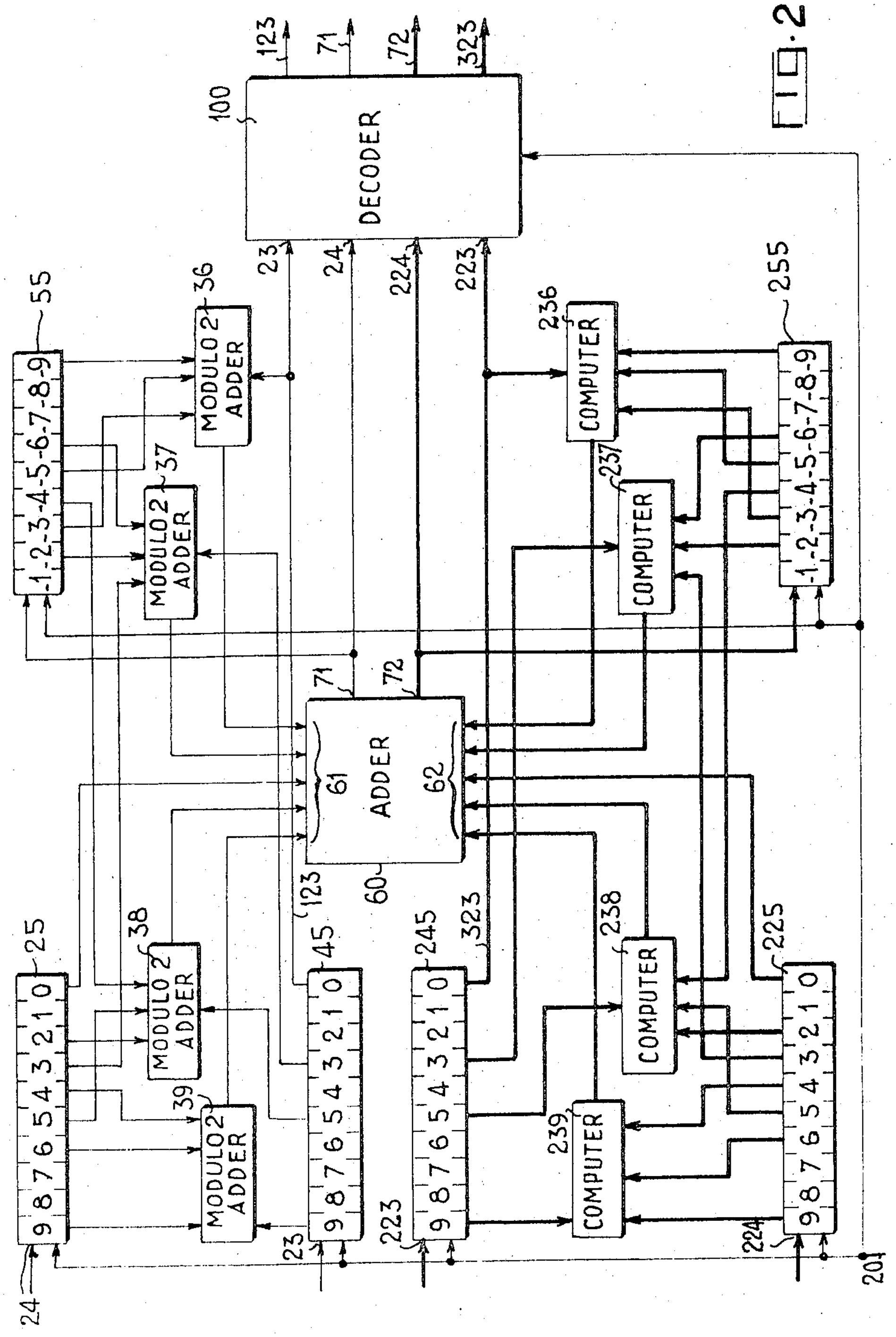
FIG. 2 is a diagram of a decoder in accordance with the invention, represented serially coupled with a further decoder for an iterated decoding of the signals delivered by the encoder of FIG. 1.

Before describing the decoding device of FIG. 2, the following will be set forth:

The reference $c'$ will be used to designate a received bit corresponding to a transmitted bit $c$.

The reference $S_{n+9}$ will be used to designate the M sum $S_{n+9} = b'_{n+9} + b'_{n+6} + b'_{n+4} + b'_n + p'_{n+9}$ (M).

It will be seen that $S_{n+9}$ is zero if none of the five bits involved in it contains an error. If this is not the case, then $S_{n+9}$ is equal to 1 or to 0 depending upon whether the number of errors is odd or even.

It will immediately be apparent that the bit $b'_n$ likewise constitutes a term of each of the sums M:

$S_{n+5} = b'_{n+5} + b'_{n+2} + b'_n + b'_{n-4} + p'_{n+5}$ (M)

$S_{n+3} + b'_{n+3} + b'_n + b'_{n-2} + b'_{n-6} + p'_{n+3}$ (M)

$S_n = b'_n + b'_{n-3} + b'_{n-5} + b'_{n-9} + p'_n$ (M)

And that no other bit appears more than once in these four expressions.

It will readily be seen that this is due to the fact that the "parity stages" (9, 6, 4, 0) of the register 15 of FIG. 1 have been chose so that the 6 numbers $N_{i,j}$ of the advance pulses required for one and the same bit to pass from a parity stage numbered $i$ to another number $j$, where $j < i$, are all different.

$S_{n+9}$, $S_{n+5}$, $S_{n+3}$, $S_n$ are a set of four independent syndromes associated with the bit $b_n$.

It will be observed that each syndrome $S_n = b'_n + b'_{n-3}\, b'_{n-5} + b'_{n-9} + p'_n$ forms part of four sets respectively associated with the bits $b'_n$, $b'_{n-3}$, $b'_{n-5}$, and $b'_{n-9}$.

In the decoder, there are assigned to each bit $b'_n$ four sums, constituting evaluations, or in other words "replicas", of the bit $b_n$, obtained by modulo 2 subtraction, or (and this comes down to the same thing, by modulo 2 addition) of the bit $b'_n$ from the associated syndromes. Thus, for the bit $b_n$ there will be the four replicas $R_{n,n} = S_n - b'_n = S_n + b'_n$ (M)

$R_{n,n+3} = S_{n+3} - b'_n = S_{n+3} + b'_n$ (M)

$R_{n,n+5} = S_{n+5} - b'_n = S_{n+5} + b'_n$ (M)

$R_{n,n+9} = S_{n+9} - b'_n = S_{n+9} + b'_n$ (M)

It will be observed that in these notations, the first index of R corresponds to the bit with which the replica is associated, while the second corresponds to the syndrome which has been used to produce the replica.

The above expressions show that a replica assigned to a bit is equal to the true value of this bit if none of the four bits involved in its composition, is faulty. It will be observed that $b'_n$ has disappeared from the expression of all the replicas $R_n$ of $b_n$; they are therefore independent of this and are moreover independent of one another.

Therefore, each of the four replicas $R_n$ associated with $b'_n$ constitutes an estimate of the true value of $b_n$, $b'_n$ constituting a fifth estimate of the latter, one indeed which will be referred to as a "simple replica", the others in future being known as "complex replicas", this making altogether five replicas.

The decoding device according to the invention is of the feedback decoding type, i.e. the complex replicas are corrected as a function of the corrections already made to the information bits which they contain. The advantages of feedback decoding far outweight the disadvantages which it has (because of the fact that it promotes error propagation).

In what follows the terms syndromes or replicas should thus be understood as relating to the case where such corrections are made in some of the bits which they contain.

Calling $b''_i$ the bit, which may or may not be equal to $b'_i$, resulting from an earlier decision on the probable value $b_i$ then $$R_{n,n} = b''_{n-3} + b''_{n-5} + b''_{n-9} + p'_n \text{ (M)}$$
$$R_{n,n+3} = b'_{n+3} + b''_{n-2} + b''_{n-6} + p'_{n+3} \text{ (M)}$$
$$R_{n,n+5} = b'_{n+5} + b'_{n+2} + b''_{n-4} + p'_{n+5} \text{ (M)}$$
$$R_{n,n+9} = b'_{n+9} + b'_{n+6} + b'_{n+4} + p'_{n+9} \text{ (M)}$$

Considering, on the other hand, a binary values which may be erroneous, it is possible to associate therewith the probability P of this value being erroneous, the probability that is correct being then $Q = 1 - P$.

This value can also be characterised by a function V, which is termed here, for short, as the likelihood thereof, defined as $V = \log_m (1-P)/P$, the choice of the positive base $m$ of the logarithm being an arbitrary matter.

V increases with $Q = 1 - P$, changing from minus infinity to plus infinity when Q changes from 0 to 1 and passing through the value 0 for $P = Q = ½$.

An advantage of this likelihood magnitude is as follows:

First of all, if the value 0 of a binary quantity $x$ has a probability $V(x = 0)$, the probability of the value 1 is $V(x = 1) = -V(x = 0)$.

On the other hand, if we consider $n$ independent estimates of a binary quantity $x$, $h$ of which are equal to 0 with respective a priori likelihoods $V'_1, V'_2 \ldots V'_h$ and of which $k$ are equal to 1 with respective a priori likelihoods of $V''_1, V''_2 \ldots V''_k$, then the a posteriori likelihood (that is to say resulting from the set of the available data) of the value 0 will be $$V(x=0) = (V'_2+V'_2+ \ldots +V'_h) - (V''_1+ V''_2 + \ldots + V''_k)$$

while the a posteriori likelihood of the value 1 will be $V(x=1) = (V''_1+ V''_2 \ldots +V''_k) - (V'_1+V'_2+ \ldots +V'_h)$.

In practice, those likelihoods are considered which are positive ($P < ½$), since it is always possible to convert to this case by inverting the value of the estimate in question.

Under these conditions, it may be decided to assign to a random binary variable an algebraic value whose sign characterises its binary value, for example + for the value 0 and the sign − for the value 1, and whose absolute value is equal to the likelihood.

The a posteriori evaluation resulting from n independent evaluations of one and the same bit, these having algebraic values $a_1, a_2 \ldots a_n$, is then given by the sign of the algebraic sum $a_1 + a_2 + \ldots + a_n$ and the probability of this evaluation by the absolute value of said sum.

In addition, the decoder in accordance with the invention has to determine the likelihood of the modulo 2 sum of several random bits.

In a decoder in accordance with the invention the algebraic sum of the likelihoods of a least some of the replicas of one and the same information bit is calculated after those likelihoods have received plus or minus signs according to the binary value of the considered replica, and the information bit is given the binary value corresponding to the sign of the algebraic sum.

It will be seen that a decoding of this type can be carried out by digital devices which to within certain limits of accuracy perform the various operations required, and that a limitation, even be it a considerable one, in the accuracy of these operations generally will not substantially modify the results, that is to say the corrected values finally assigned to the various bits.

Referring to the equalities giving the values of the replicas, it will be seen that it is necessary to store information bits, parity-check bits and decoded information bits, this applying also for the likelihood signals.

FIG. 2 shows a two-stage decoding device, only the first stage having been shown in any detail and the second, indicated by the block 100, being identical to the first.

The elements of the first stage comprise two circuits, a value and a likelihood circuit, supplying an algebraic adder 60 respectively through its two groups of inputs 61 and 62.

The value circuit comprises two inputs 24 and 23 supplied respectively with the bits $b$ and the bits $p$ appearing at the outputs 14 and 13 of the encoder shown in FIG. 1.

This circuit comprises a register 25 identical to the register 15 of FIG. 1, with its stages marked 9 to 0 commencing from the input, constituted by the input 24 of the decoder.

The register 25 comprises an input connected to an input 20 receiving advance pulses I′, these pulses I′ being synchronised in phase with the received bits by one or the other of the conventional devices used for the purpose in all binary transmission systems.

To store the parity-check bits, a register 45 identical to the register 25 is supplied through the parity-check input 23 and also receives the advance pulses I′.

The adder 60, fed in the way indicated hereinafter when a bit $b'_n$ occupies stage 0 of the register 23, supplies at its output 71 the corresponding decoded bit $b''_n$. This output 71 supplies a shift register 55 with nine stages numbered −1 to −9 commencing from its input stage, this register furthermore receiving the advance pulses.

The decoder comprises four modulo 2 adders, 36 to 39, supplying the four complex replicas in accordance with the aforesaid formulae, the connection of which adders will be apparent from these same formulae:

The adder 36 has its four inputs connected to the outputs of the stages −3, −5 and −9 of the register 55, and to that of the stage 0 of register 45, and produces $R_{n,n}$.

The adder 37 has its four inputs connected to the output of the stage 3 of the register 25, to those of stages −2 and −6 of the register 55, and to that stage 3 in the register 45, and supplies $R_{n,n+3}$.

The adder 38 has its inputs connected to the output of the stages −4 of the register 55, to those of the stages 2 and 5 of the register 25, and to that of the stage 5 of the register 45, and supplies $R_{n,n+5}$.

The adder 39 has its four inputs connected to the outputs of the stages 9, 6 and 4 of the register 25 and to that of stage 9 of the register 45, and supplies $R_{n,n+9}$.

The outputs of the four adders 36 to 39 and that of the stage 0 of the register 25, supply the five inputs of the group of inputs 61 of the adder 60.

To each input bit of the value circuit, there corresponds a likelihood. This may for example have a fixed value, taking account only of the general probability of error in the connection, for the period of operation in question.

It may also be a likelihood evaluated as a function of an error probability taking into account the quality of the received signal representing the input bit. In either case, this probability may be quantized and represented by a number *r* of parallel bits; it will be assumed, by way of example, that $r = 4$. To calrify the language the term digit will be used to for the bits used to represent a likelihood in the binary system.

The likelihood circuit which is now to be described operates in parallel vis-a-vis the various digits representing a likelihood.

In order not to overburden the drawing, the multiple inputs, outputs and connections comprising parallel elements respectively assigned to the digits of one and the same number, have been represented by single outputs, inputs or connections drawn in thicker line than the simple inputs, outputs or connections.

The likelihood circuit is constituted by elements which are homologous of those used in the value circuit but not identical to their counterparts, and an element of the likelihood circuit is indicated by a reference number greater by 200 than the number indicating its counterpart in the value circuit.

Thus, in the likelihood circuit, there are two multiple inputs 224 and 223 respectively assigned to the likelihood signals associated with the input information and parity-check bits.

The multiple input 224 supplies an assembly 225 of *r* parallel registers, each of them being identical to the register 25. The block is divided into ten boxes numbered in the same way as the register 25. But each box in the drawing symbolises *r* stages of the same position number belonging to the *r* registers, such a system being referred to henceforth as a "multiple stage", and the output connected to each box is a multiple output constituted by the outputs of the stages having identical position numbers in the assembly 225.

The likelihood circuit comprises two other systems of *r* parallel registers 245 and 255, corresponding in the same fashion to the registers 45 and 55 of the value circuit.

Each of these three systems of registers comprises an advance input connected to the input 20 supplied with the advance pulses.

To the four modulo 2 adders, 36 to 39, of the value circuit, there correspond four computers 236 and 239 which are supplied by the systems of registers 225, 245, 255 in the same manner as the adders 36 to 39 are supplied by the registers 25, 45 and 55, but with the difference that the counterpart of a single connection in the value circuit is a multiple connection linking a multiple output of a system of registers to a multiple input of the computer.

Each of these computers computes, with an accuracy which will be specified later, the likelihood of the replicas supplied at the same instants by that adder of the value circuit of which it is the counterpart, and the numbers of *r* digits representing the likelihoods of the replicas are applied to the algebraic adder 60 through its second group, 62, of five inputs, the five inputs here being multiple inputs.

The algebraic adder 60 is a digital adder of conventional design, producing the algebraic sum of five numbers whose absolute values are supplied to it respectively through its five multiple inputs 62 and whose signs are applied to it by the five single inputs 61, a 0 bit corresponding to the + sign and a 1 bit to the − sign as hereinbefore indicated.

The adder 60 supplies at its single output 71 the decoded information bits, this value being 1 if the result of the algebraic addition is negative and 0 if the result is positive.

On the other hand, simultaneously and at its output 72, it supplies the likelihood of the bit which is appearing at its output 71, this likelihood being the absolute value of the result of the algabraic addition, in accordance with what has been stated hereinbefore.

This device lends itself readily to iteration.

It will be remembered that iterative decoding consists in repeating, in a second stage, the decoding operation performed in a first stage taking into account in the input signals decisions made in the decoding operation performed by the preceding device. (Iterated decoding has been proposed, for a majority (i.e. not weighted) threshold decoding based on the use of the syndromes, in French Patent No. 2,062,844.

In FIG. 2, a second stage 100 identical to the decoder which has just been described has been shown, this having inputs 24, 23, 244 and 223 respectively connected to the outputs 71, 123 (output of the stage 0 of the register 4), 72 and 323 (output of the stage 0 of the register 245) of the first decoder stage, the input 20 being common to both stages.

Also shown are the four outputs 71, 72, 123 and 323 of the second decoder stage, the latter two being used only for feeding a modulo 2 adder and a likelihood computer of this stage if the second decoder stage is not followed by a third one.

The register 55 of a decoder stage can be combined with the stage 25 in the preceding stage. Similarly, too, the system of registers 225 of one stage can be combined with the system of registers 225 of the next.

It will be observed that with the exception of the computers 236 to 239, which are all identical to one another, the elements of the decoder shown in FIG. 2 are all conventional ones.

Practical means of designing these computers will now be indicated.

Calculation shows that the likelihood $V_{1,2,\ldots n}$ of the M sum of *n* bits having respective likelihoods $V_1, V_2 \ldots V_n$ is:

$$V_{1,2,\ldots n} = f^{-1}\,[f(V_1)\cdot f(V_2)\ldots f(V_n)]$$

where $$f(V) = (m^V-1)/(m^V+1),$$

and $f^{-1}$ designates the reciprocal function of $f$, i.e. such that $f^{-1}\,[f(x)] = x$.

Sufficient accuracy can be obtained by restricting operations to whole-number values of the likelihoods V, provided that the logarithmic base *m* utilised in the expression for V is sufficiently small.

As P tends toward 0, V tends toward $\log_m (1/P) = -\log_m P$ and P tends towards $m^{-V}$, the ratio between two error probabilities corresponding to two successive whole-number values of V thus tending towards $1/m$.

A concrete embodiment of the computer likewise inherently requires a limitation to a maximum A of the likelihoods actually used in practice.

A function $g(V)$ will now be used to designate the greatest integer not higher than $-(m^A/2)\log_e[f(V)]$.

The coefficient of the Napierian logarithm has been chosen so that the minimum in the function $g(V)$, reached at $V = A$, is equal to 1.

We then have:

$V_{1,2} = g^{-1}[g(V_1) + g(V_2)]$ from which we obtain:

$g(V_{1,2}) = g(V_1) + g(V_2)$ with the result that the modulo 2 sum of an arbitrary number p of respective likelihood terms $V_i$ ($i$=1,2 . . . $p$) has a likelihood $V_{1,2\ldots p}$ such that $g(V_{1,2\ldots p}) = \Sigma g(V_i)$.

By way of example for $m = 2$, $A = 15$, the table below gives the values of V and g(V) as well as the values of $2^{15-V}$. The result is that g(V) can be represented with very close approximation by $2^{15-V}$, if the likelihood is not too small.

TABLE

| V | g(V) | $2^{15-V}$ |
|---|---|---|
| 0 | infinite | |
| 1 | 18,000 | 16,384 |
| 2 | 8,369 | 8,192 |
| 3 | 4,118 | 4,096 |
| 4 | 2,051 | 2,048 |
| 5 | 1,024 | 1,024 |
| 6 | 512 | 512 |
| 7 | 256 | 256 |
| 8 | 128 | 128 |
| 9 | 64 | 64 |
| 10 | 32 | 32 |
| 11 | 16 | 16 |
| 12 | 8 | 8 |
| 13 | 4 | 4 |
| 14 | 2 | 2 |
| 15 | 1 | 1 |

Figure 3:
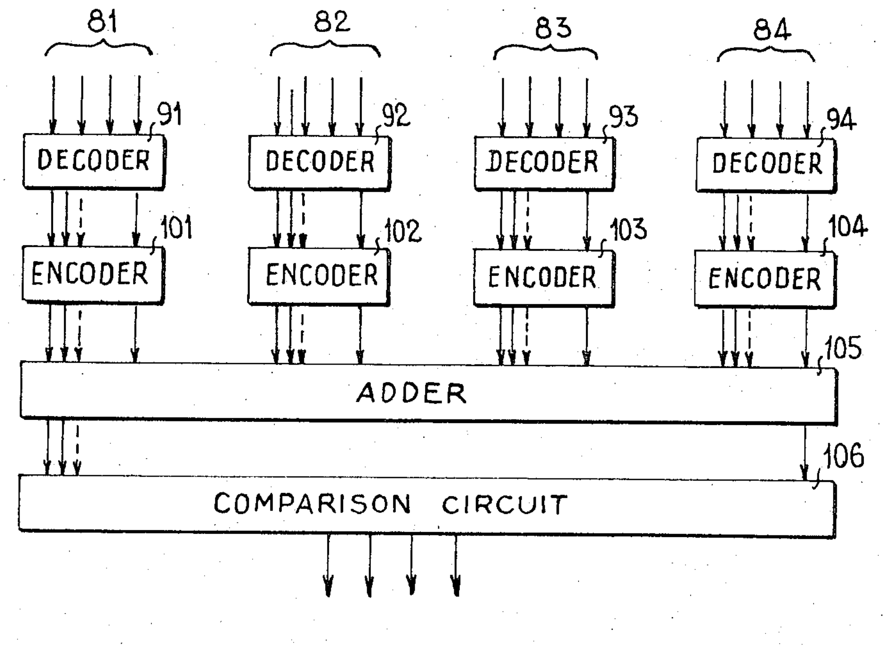
FIG. 3 is the detailed diagram of an element of the decoder as shown in FIG. 2.

This being so, in FIG. 3 the computer 239, for example, has four multiple inputs 81, 82, 83, 84 with four wires, each supplied respectively with the binary numbers representing the likelihoods $V_{n+9}$, $V_{n+6}$, $V_{n+4}$, and $V'_{n+9}$ respectively supplied by the stages 9, 6 and 4 of the multiple register 225 and the stage 9 of the register 245. The four wires of the multiple input 81 are connected to the inputs of a "binary-position" decoder 91, with 15 outputs corresponding respectively to the fifteen whole-integer values 1 to 15 which $V_{n+9}$ may have, and supplying a signal at its $j^{th}$ output when the number applied to its inputs is $j$. The 15 outputs of the decoder 91 are connected with the 15 inputs of a "position-binary encoder" 101 with 16 outputs which in the binary system supply the number $g(j)$ appearing in the second column of the foregoing table.

The other multiple inputs of the computer supply identical circuits comprising decoders 92, 93, 94 and encoders 102, 103 and 104. The multiple outputs of the four encoders are respectively connected to the inputs of a four-number binary adder 105, the adder supplying the sum G, of the functions $g$ of the four input likelihoods.

By reference to the table of values of g(V) and taking into account the fact that V can vary exclusively between 1 and 15, it will be seen that $g$ could adopt values ranging between 4 and 72,000.

$U_k$ designating the value $g(V)$ rounded off its nearest whole number value, for $V = k + ½$ ($k$ = 1,2 . . . 13), the value $V = k_o$ will be associated with the replica in question, if G is between $U_{k_0 -1}$ and $U_{k_0}$ ($k_o > 2$), and the value $V = 1$ if G is greater than $U_1$.

To this end, the outputs of the adder are connected to a comparison circuit 106 comparing G with these 13 values of $U_k$, and delivering the corresponding likelihood in the form of a four-digit binary number.

It will be observed that the diagram of FIG. 3 is much simplified if the approximation $g(V) = 2^{15-V}$ is adopted.

In this case, each "position-binary encoder" will have no more than 15 outputs (the maximum value of $g(V)$ being $2^{14}$, where $V$ = 1,2 . . . 15) and will simply control the appearance of the digit 1 at its $(16-j)^{th}$ output when its $j^{th}$ input is supplied ($j$ being the value of the input likelihood).

The sum produced by the adder 105 will have a minimum value of four and a maximum value of $2^{16}$.

In addition, it will be possible to adopt the approximation $U_k = 3.2^{13-k}$ for $k$ = 1,2 . . . 13, in respect of the threshold values. It will be found then that the comparison of G with $U_1, U_2 \ldots U_{13}$, comes down to a determination of the weight $2^W$ of the digit 1 of highest weight in the number representing G and to the determination of the value D of the digit of next lower weight.

For a value of W equal to or greater than 14, the likelihood of the replica will be taken to be equal to 1.

For W values less than 14, the likelihood of the replica will be taken to be equal to 15 − W − D.

It will be observed on the other hand that the proposed quantization for the values of V makes it possible to compute in a simpler way the value of $V_{1,2,\ldots n}$ by means of memories or of matrices. For example, a first matrix receiving the decoded values of $V_1$ and $V_2$ supplies the decoded value of $V_{1,2}$, a second matrix being assigned to the calculation of $V_{1,2,3}$ by means of $V_{1,2}$ and $V_3$ and so on, all the matrices being identical and connected by means of a premiminary calculation bearing only on (1+2 . . . + 15+ 16) = 136 different cases.

The value $V_{1,2,\ldots n}$ is thereafter encoded in digital form.

Lastly a still greater simplification rests on the experimental fact, confirmed by theoretical considerations, that the likelihood concept may still be used with advantage by the very simple approximation consisting in making $V_{1,2\ldots n}$ equal to the smallest of the values $V_1$, $V_2, \ldots V_n$. This operation may be easily performed by conventional digital circuits, for example comparing $V_1$ and $V_2$, then the smaller of those two values with $V_3$ and so on.

When all the $V_i$ ($i$ = 1,2, . . . $n$) are equal or when several $V_1$ have the minimum value, this same value may still be used for $V_{1,2,\ldots n}$. However, the approximation is not so good in this case.

It will be clear, on the other hand that the parity-check bits and the likelihoods associated therewith, remain unchanged through the successive stages of the decoder. Since a parity-check bit appears in the expression of each of the replicas, the result is that at each stage, the likelihood of the replicas is subject to a top limit imposed by the initial likelihood of the parity-check bits. In fact, the error configurations, fortunately rare, affecting the majority of the parity-check bits present in the expression of the replicas assigned to one and the same information bit, produce an incorrect decision which iteration is powerless to correct.

This drawback is avoided in a varient embodiment, which will now be described. It should be pointed out, first of all, that if there are $q+1$ with $q$ at least equal to 3 replicas of each information bit, a decision on this bit can use a smaller number of replicas. The principle of this varient embodiment consists in utilising for the decision only $q-1$ of the replicas of each information bit, the bits of the two remaining replicas combined in a different way, making it possible to carry out a similar weighted decision on the parity-check bit having the same position number, by forming two independent replicas of this parity-check bit.

The two replicas not used in the decision on an information bit $b_n$ will be the received data bit itself, i.e. $b'_n$, and the replica $R_{n,n}$ whose expression has already been stated, namely:

$R_{n,n} = b''_{n+3} + b''_{n+5} + b''_{n+9} + p'_n$ (M)

It will readily be seen that:

$D_{n,n} = b''_{n+3} + b''_{n+5} + b''_{n+9} + b'_n$ (M)

is a replica of the parity-check bit $p_n$; $p'_n$ is obviously another one.

The bits used to form them are the same as those of the two unused replicas of $b_n$.

An estimate of the parity bit $p'_n$ is obtained, therefore, by addition of the algebraic values of $p'_n$ and of $D_{n,n}$, in other words through substituting $b'_n$ for $p'_n$ in $R_{n,n}$.

Figure 4:
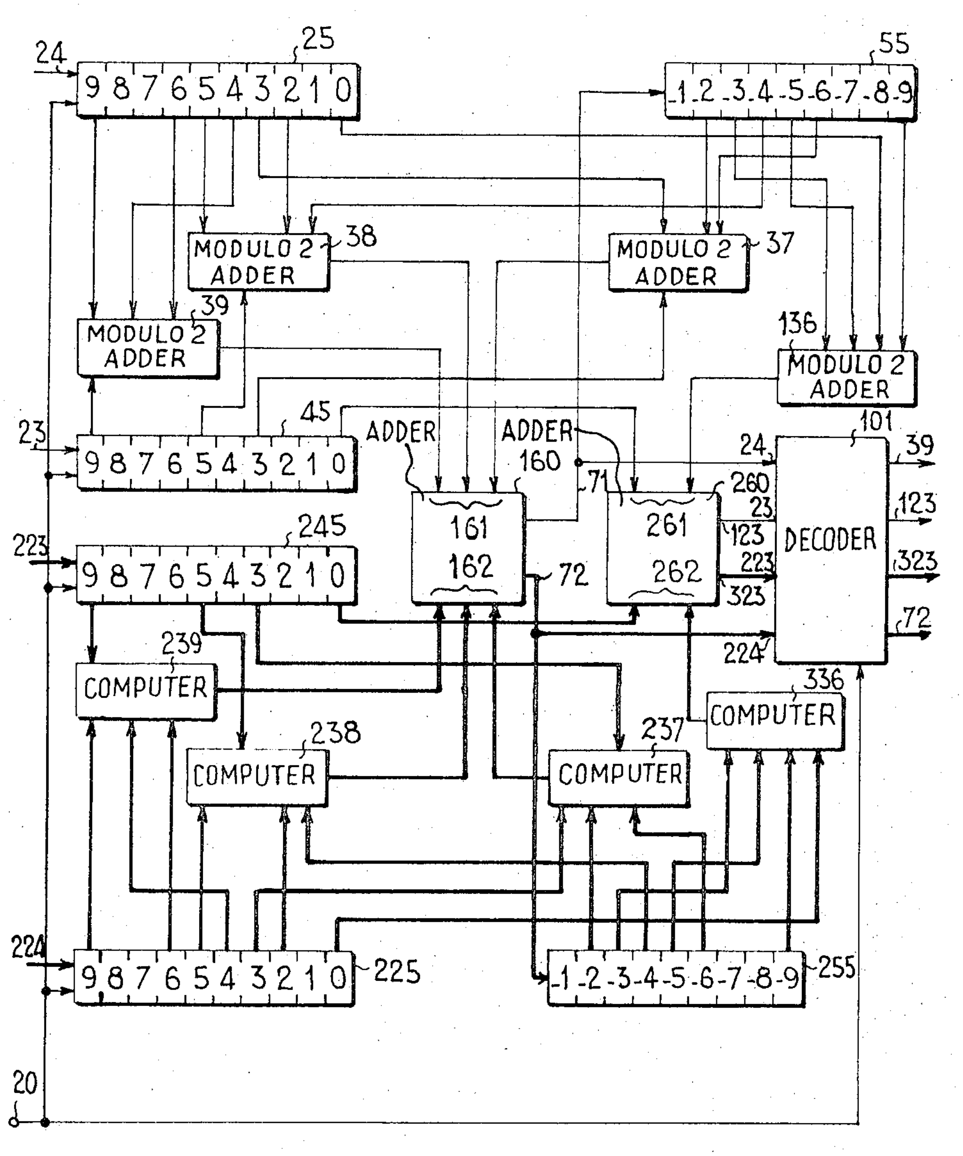
FIG. 4 is the diagram of a variant embodiment of the decoder of FIG. 2.

The diagram of the corresponding device, illustrated in FIG. 4, derives directly from this principle.

Elements having the same reference numbers in FIGS. 2 and 4 are identical to each other. As in FIG. 2, a two-stage decoder has been illustrated, only the first stage of which has been shown in detail; the second, represented by the block 101, is identical to the first.

As in FIG. 2, there are two circuits to be distinguished, one the value circuit, the other the likelihood circuit.

The diagram of FIG. 4 comprises two algebraic adders 160 and 260 replacing the adder 60 of FIG. 2, each adder having two groups of inputs 161 and 162 on the one hand and 261 and 262 on the other, respectively connected to the value circuit and to the likelihood circuit.

The adder 160 is supplied at its groups of inputs 161 and 162 with the signals from the modulo 2 adders, 37, 38 and 39 on the one hand, and from the computers 237, 238 and 239, on the other, respectively. These elements are identical to their counterparts in FIG. 2, and are connected in the same way.

The adder 260 is supplied at its two groups of two inputs, 261 and 262, with the signals coming respectively from the modulo 2 adder, 136, and the stage numbered 0 in the register 45, and from the computer 336 and the multiple stage numbered 0 in the system of registers 245.

The modulo 2 adder, 136, and the computer 336, are identical to their counterparts 36 and 236 in FIG. 5, but connected in a manner which will be indicated hereinafter (in accordance with the principle already enunciated):

The inputs of the adder 136 are connected to the stage 0 of the register 25 and to the stages −3, −5 and −9 of the register 55; those of the computer 336 are connected to the multiple stage 0 in the system of register 225, and to the multiple stages −3, −5 and −9 in the system of registers 255.

The outputs 71 and 72 of the adder 160, as well as the outputs 123 and 323 of the adder 260, play the same part as the outputs similarly numbered in FIG. 2, and are connected to the next stage, in the same way.

It will be observed that, in the decoders of FIGS. 2 and 4, if the input likelihoods correspond to the same general error probability, the production of the corresponding input signals comes down to the production of a single digital signal. In any other case, assuming P to be the known error probability in digital form, it is a simple matter to determine once and for all the discrete values $P_0, P_1 \ldots P_{A-1}$ such that $V = j$ for P values ranging between $P_{j-1}$ and $P_j$, and $V = A$ for P values of less than $P_{A-1}$.

It should be pointed out that it may happen that the adder 160 of the decoder shown in FIG. 2, and the adders 160 and 260 of the decoder shown in FIG. 4, will produce a 0 result. These adders can, for example, readily be designed so that they then arbitrarily produce the signal 0 at the value output and the lowest used quantized likelihood (that is to say 1 in the embodiments described), at the likelihood output.

What is claimed is:

1. A decoding device of the weighting and feedback type for decoding messages, comprising information and parity-check bits, transmitted in a systematic recurrent binary code adapted for threshold decoding, each received bit being associated with a likelihood signal, the likelihood of a random value being defined as a magnitude V proportional to $\log_m (1-P)/P$, where $m$ is a positive number, and P the probability of this value being erroneous, said decoding device comprising at least a first decoder, said decoder comprising: first, second, third and fourth storing means having outputs, for respectively storing said information bits, said parity-check bits, said likelihood signals associated with said information bits, and said likelihood signals associated with said parity-check bits; modulo 2 adding means having a first group of inputs coupled to said first and second storing means, a second group of inputs and $q'$ outputs for forming, for each received information bit, constituting a single replica of the corresponding transmitted bit, $q'$ ($q'$ being a positive integer) independent complex replicas of this transmitted bit, said complex replicas being the modulo 2 sums respectively resulting from the suppression of the considered received information bit in $q'$ syndromes containing it, and the substitution in said syndromes of the decoded value for the received value as concerns the already decoded information bits, said $q'$ outputs of said adding means and a predetermined one of said outputs of said first storing means forming $(q' + 1)$ first outputs for simultaneously delivering $(q' + 1)$ replicas of an information bit; computing means having a first group of inputs coupled to said third and fourth storing means, a second group of inputs, and $q'$ outputs, for generating likelihood signals, at least approximately representative of the likelihood of each of said $q'$ complex replicas, said $q'$ outputs of said computing means and a predetermined one of said outputs of said third storing means forming $(q' + 1)$ second outputs for simultaneously delivering $(q' + 1)$ likelihood signals associated with said $(q' + 1)$ replicas; an adder having a first group of $q''$ inputs respectively coupled to $q''$ of said $(q' + 1)$ first outputs, for receiving $q''$ of said $(q' + 1)$ replicas where $q''$ is greater than 1 and smaller than $(q' + 2)$, a second group of $q''$ inputs respectively coupled to $q''$ of said $(q'+1)$ second outputs for receiving the $q''$ likelihood signals associated with said $q''$ replicas, and first and second outputs, for forming the algebraic sum of said $q''$ likelihood signals, respectively associated with a plus or minus sign according to the binary value of the associated replica, and for delivering at said first output of said adder a decoded value corresponding to the sign of said algebraic sum, and at said second output a likelihood signal associated with said decoded binary value, and representative of the absolute value of said algebraic sum; fifth storing means coupled to said first output of said adder for storing the decoded values; and sixth storing means coupled to said second output of said adder for storing said likelihood signal associated with the decoded values; said second group of inputs of said adding means being coupled to said fifth storing means and said second group of inputs of said computing means being coupled to said sixth storing means.

2. A decoding device as claimed in claim 1, wherein said likelihood signals are stored in the form of binary digital signals representative of a quantized value of V, limited by a non-negative minimum value $a$ and a maximum positive value A, and wherein said modulo 2 adding means are digital adding means and said algebraic adder a digital adder.

3. a decoding device as claimed in claim 2, wherein the number of parity-check bits being equal to the number of information bits in said messages, and the maximum number $q$ of independent complex replicas which can be formed for each information bit being at least equal to 3, and that one of said $q$ complex replicas which contains the parity-check bit having the smallest position number not containing any other parity-check bit, the $q'$ complex replicas formed by said modulo 2 adding means are the $(q-1)$ other complex replicas of each information bit, and wherein said decoding device further comprises a modulo 2 adder for forming, for each received parity-check bit, constituting a simple replica of the corresponding transmitted bit, a complex replica of this transmitted bit, said complex replica being the modulo 2 sum resulting from the substitution, in that complex replica of a transmitted information bit, which contains the considered received parity-check bit and which is not included in said $q'$ complex replicas of said last mentioned transmitted information bit, formed by said adding means, of said considered received parity-check bit by the received bit corresponding to said last mentioned transmitted information bit, said modulo 2 adder having a first input coupled to said first storing means and further inputs coupled to said fifth storing means, and an output, said output of said modulo 2 adder and a predetermined one of said outputs of said second storing means forming two first outputs for simultaneously delivering the two replicas of a parity-check bit; said decoding device further comprising: a computer for generating digital signals approximately representative of the likelihood of the complex replica of each parity-check bit, said computer having a first input coupled to said third storing means and further inputs coupled to said sixth storing means, and an output, said output of said computer and a predetermined one of said outputs of said fourth storing means forming two second outputs for simultaneously delivering the two likelihood signals respectively associated with said two replicas; and a further algebraic adder having two inputs respectively coupled to said two first outputs, and two further inputs, respectively coupled to said two second outputs, and first and second outputs, for forming the algebraic sum of said two digital likelihood signals respectively associated with a plus or minus sign according to the binary value of the associated replica and for delivering, at said first output of said further algebraic adder, a decoded value corresponding to the sign of said last mentioned algebraic sum, and at said second output of said further algebraic adder, a likelihood signal associated with said decoded binary value, and representative of the absolute value of said algebraic sum.

4. A decoding device as claimed in claim 2, comprising a further decoder having two inputs respectively coupled to said first and second outputs of said algebraic adder, and two further inputs respectively coupled to said second and fourth storing means.

5. A decoding device as claimed in claim 3, comprising a further decoder having two inputs respectively coupled to said first and second outputs of said first mentioned algebraic adder and two further inputs respectively coupled to said first and second outputs of said further algebraic adder.

6. A decoding device as claimed in claim 2, wherein $m$ is equal to 2, and wherein said quantized values of V are integer values.

7. A decoding device as claimed in claim 2, wherein said computing means comprise matrices.

8. A decoding devices as claimed in claim 2, wherein said computing means deliver for the likelihood signals representative of the likelihood $V_{1,2,\ldots,n}$ of a complex replica formed by the modulo 2 sum of n terms, the likelihood signals of which respectively have the values $V_1, V_2 \ldots V_n$, the smallest of those latter values.

* * * * *